July 7, 1970  C. D. EICHELBERGER ET AL  3,519,733
BUS STRUCTURE COMPRISING AN INSULATING SUPPORT AND A
COATED ELECTRIC BUS BAR
Filed July 24, 1969
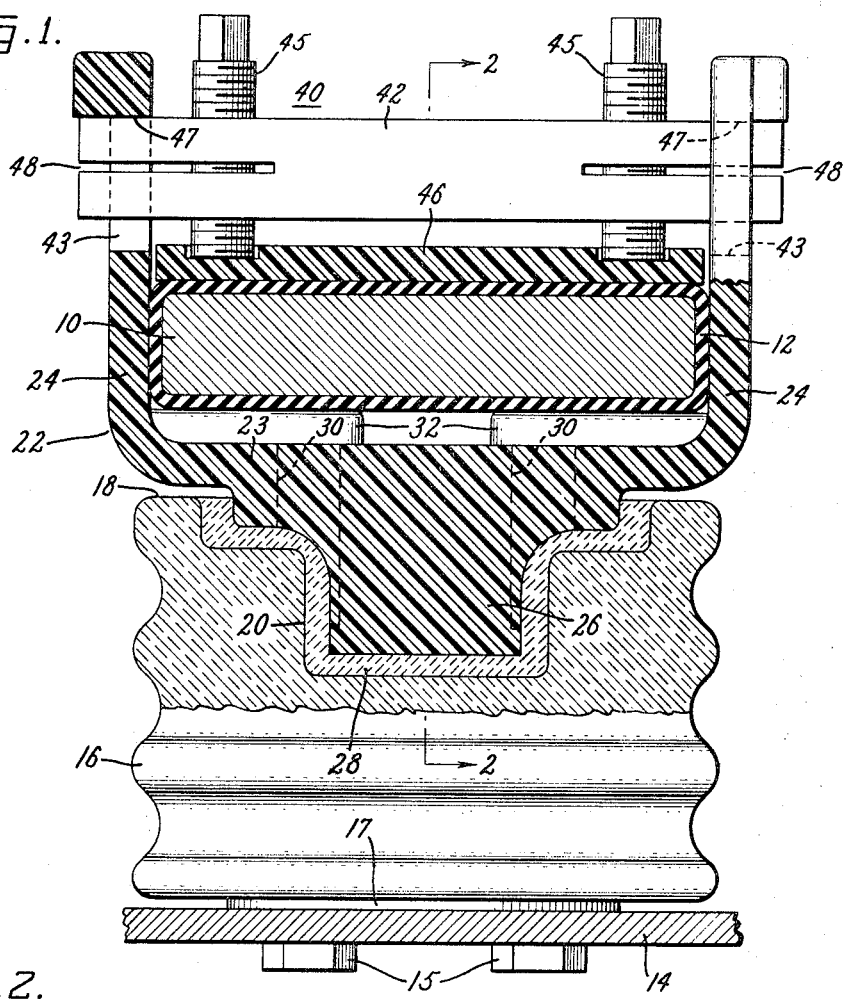
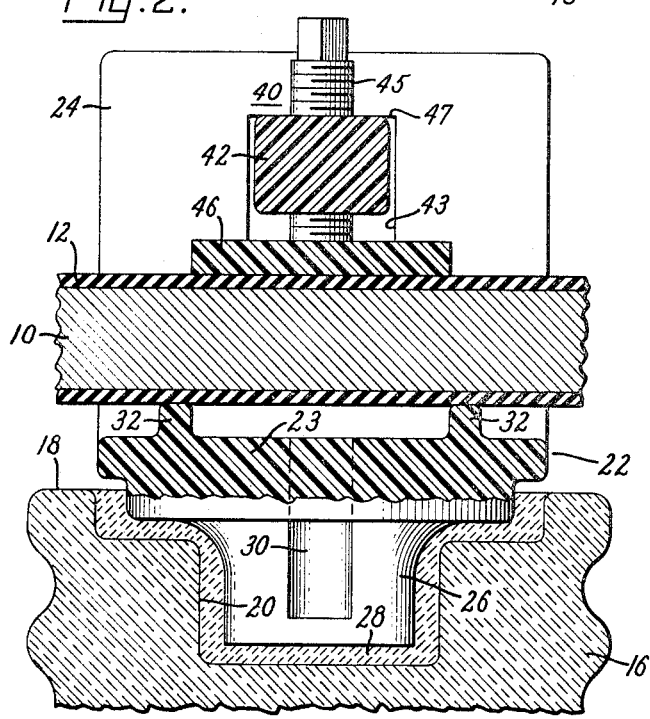
INVENTORS:
CHARLES D. EICHELBERGER,
BY   PHILIP C. NETZEL,
William Freedman
ATTORNEY United States Patent Office 3,519,733
Patented July 7, 1970

3,519,733
BUS STRUCTURE COMPRISING AN INSULATING SUPPORT AND A COATED ELECTRIC BUS BAR
Charles D. Eichelberger, Ridley Park, and Philip C. Netzel, Milmont Park, Pa., assignors to General Electric Company, a corporation of New York
Filed July 24, 1969, Ser. No. 844,365
Int. Cl. H01b 17/18
U.S. Cl. 174—171                                    3 Claims

ABSTRACT OF THE DISCLOSURE

Bus structure comprising a bus bar completely coated with insulation, a post-type porcelain insulator supporting the bus bar, and a U-shaped bracket of insulating material mounted atop the insulator and receiving the bus bar between spaced-apart arms at opposite ends of the bracket. Clamping means clamps the bus bar against the bight portion of the U-shaped bracket without perforating its insulating coating. An insulating plug integral with the bracket extends into a cavity in the insulator and is bonded to the insulator to fix the bracket to the insulator. All structure adjacent the bus bar in the region of the insulator is of insulating material.

---

This invention relates to an insulating support and an electric bus bar and, more particularly, relates to an insulating support and a bus bar of the type that has all of its external surfaces in the region of the support covered with an unbroken insulating coating.

To permit a reduction in the electrical clearances between adjacent high voltage bus bars and also between the bus bars and ground, it has been proposed that the bus bars be completely covered with a thin unbroken coating of insulating material. See, for example, U.S. Pat. 3,180,922—Gallant et al. While such an unbroken coating does permit some reductions in electrical clearance, the full reductions safely attainable with such unbroken insulating coatings typically have not been realized, primarily because of the way in which the bus bars have been supported. In this respect, in the metal-clad switchgear field industry standards have required that porcelain insulators be used for supporting the bus bars of the switchgear. The usual approach to complying with these standards is to use conventional post-type porcelain insulators of the same voltage rating as the switchgear and to suitably secure the bus bars to the insulators.

Such porcelain insulators are quite long and consume an undue amount of space, inconsistent with the desired small electrical clearances. When shorter insulators have been used and electrical clearances have been reduced, considerable difficulty has been had in preventing arcovers from the usual metal end plate on the porcelain insulator or from metal clamping structure used for securing the bus bar to the insulator. Even though such parts are electrically insulated from the bus bar by insulation that includes the unbroken coating on the bus bar, flash-overs from such parts have occurred at unacceptably low voltages.

An object of our invention is to construct the bus bar supporting arrangement of a switchgear unit that includes a bus bar with an unbroken insulating coating in such a manner that porcelain insulators having a much lower voltage rating than the switchgear unit itself can be used in the supporting arrangement.

Another object is to provide a simple, easy to manufacture bus bar-supporting arrangement that is free of metal parts in the region adjacent the bus bar.

In carrying out the invention in one form, we provide a post-type porcelain insulator and a bus bar that has a coating of insulating material completely covering its external surfaces in the region of said insulator. The insulator has an end surface facing the bus bar and a cavity in said end surface. Mounted on the insulator is a U-shaped bracket of insulating material having a bight portion extending across said end surface and a pair of arms at opposite ends of the bight portion. A plug on the bight portion extends into the cavity and is bonded to the insulator. Means is provided for clamping the bus bar to the bracket in a position between the arms without perforating said insulating coating. All of the structure adjacent said bus bar in the region of said insulator and all of that interposed between said insulator and said bus bar, including said bracket, plug, and clamping means, are of insulating material.

For a better understanding of the invention, reference may be had to the following description taken in conjunction with the accompanying drawings, wherein:

FIG. 1 is a cross-sectional view through a bus bar supporting arrangement embodying one form of the invention;

FIG. 2 is a sectional view along the line 2—2 of FIG. 1.

Referring now to FIG. 1, there is shown an electric bus bar 10 of conductive material that has all of its external surfaces completely covered with a coating 12 of insulating material. The bus bar is supported on a grounded metal housing 14 by support means including a post type porcelain insulator 16. Porcelain insulator 16 is suitably secured to a metal housing 14, as by means of screws 15 extending through the housing 14 and threaded into tapped holes in a metal end plate 17 on the lower end of the insulator.

Porcelain insulator 16 has a top surface 18 facing the bus bar 10 and a cavity 20 formed in the top surface. Mounted atop the insulator 16 is a U-shaped bracket 22 of insulating material. This bracket has a bight portion 23 extending across the top surface of the insulator 16 and a pair of arms 24 located at opposite ends of the bight portion and extending from the bight portion in a direction away from the insulator 16. Bracket 22 also includes a plug 26 extending downwardly from the bight portion 23 and located in the cavity 20.

A suitable electrically non-conducting cement 28 fills the space between the plug and the cavity and is used for bonding the plug to the insulator. This cement is introduced into the cavity through spaced-apart holes 30 in the bracket which terminate short of the bottom of the plug. The presence of these holes 30 results in the plug having an irregular outer surface that coacts with the cement after it has hardened to provide an interlocking effect for strengthening the bond between the plug and the insulator.

The bus bar 10 is mounted on the bracket 22 is a position between the arms 24. The bus bar is seated on a plurality of ribs 32 that are integral with the bight portion and that maintain the bus bar spaced a short distance from the bight portion. These ribs are integrally joined to the arms 24 adjacent the base of the arms and serve to strengthen the arms to increase their stiffness and resistance to deflection from forces directed laterally of the bus bar length.

For clamping the bus bar 10 against the ribs 32, a clamping arrangement 40 is provided. This clamping arrangement 40 comprises a reaction bar 42 of insulating material which is received in a pair of aligned openings 43 provided in the arms 24 of the bracket. Two clamping screws 45 of insulating material are threaded into tapped holes in the reaction bar 42. Each of these screws has a flat surface at its lower end that bears against a bearing plate 46 of insulating material seated on the bus bar. When the screws are suitably rotated, they force the bearing plate 46 in a downward direction, thereby clamping the bus bar between ribs 32 and the bearing plate 46.

As an incident to this clamping action, the reaction bar 42 is urged upwardly into engagement with the top walls 47 of openings 43 in the arms 24. A laterally-extending slot 48 provided in each end of the reaction bar 42 permits a small amount of deflection of the end of the bar, and this deflection serves to lock the associated screw 45 against accidental loosening while it is clamping the bus bar in position. The details of this clamping arrangement are not a part of our invention. Such details are explained more specifically and are claimed in application S.N. 844,366—Close, filed July 24, 1969 and assigned to the assignee of the present invention.

It should be noted that the clamping arrangement does not perforate or otherwise impair the insulating coating 12, which completely covers the bus bar 10 in the region of the insulating support. The clamping screws 45 act on the bearing plate 46, which serves as a barrier to protect insulating coating 12 and to distribute the clamping force more uniformly over the bus surface. The clamping arrangement will allow the bus bar to expand and contract along its length in response to temperature changes. Such expansion and contraction simply cause the insulated bus bar to move slightly in a longitudinal direction with respect to the bearing plate 46 and the rest of the support. Lateral movement of the bus bar 10 is opposed by the arms 24 which engage the insulating coating 12 on the lateral edges of the bus bar. These arms 24 are quite stiff in view of their substantial thickness and the reinforcement provided by ribs 32 and can therefore withstand relatively high laterally-directed forces without damage. Such forces can result from magnetic interaction between closely-adjacent bus bars. Movement of the bus bars away from the insulator 16 is prevented by the screws 45, which take such forces in compression, and the reaction bar 42 in which the screws are threaded.

The unbroken insulating coating on the bus bar 10 enables us to reduce electrical clearances between the bus bar and nearby structure at ground potential or some other differential potential. The use of such unbroken insulation is not in itself new. But, typically, the full reductions safely attainable with such unbroken insulation have not heretofore been realized because conventional porcelain insulators and conventional clamps have been used for supporting and mounting the bus bar. The conventional porcelain insulator has a metal end cap on which the bus bar is mounted, and the conventional clamp includes metal parts. Through capacitive coupling effects, high voltages approaching those of the bus bar can be built up on such metal hardware, even though out of contact with the bus bar. These high induced voltages can produce high electric stresses adjacent the metal parts which can cause an arc-over therefrom across the clearance space. This problem becomes especially severe if the clearance space has already been reduced to capitalize on the unbroken insulating coating on the bus bar.

We are able to substantially reduce the likelihood of such arc-overs because we have no metal structure adjacent the bus bar in the region of the support. Note particularly that the metal end cap typically present atop the insulator is absent. All the mounting structure and the clamping structure atop the porcelain insulator is of insulating material. Thus, there is no metal hardware adjacent the bus bar on which high voltages can be induced by capacitive effects.

By eliminating such metal hardward and by utilizing an unbroken insulating coating on the bus bar 10, we are able to use 15 kv. metal-clad switchgear a supporting insulator rated for 5 kv. instead of the usual 15 kv. insulator. The 5 kv. insulator is 3½″ long as compared to the 6″ length of the 15 kv. insulator. We are also able to use a 3 inch spacing between the conductors of adjacent phases instead of the 6 inch spacing typically used in 15 kv. metal-clad equipment.

While we have shown and described a particular embodiment of our invention, it will be obvious to those skilled in the art that various changes and modifications may be made without departing from our invention in its broader aspects; and we, therefore, intended herein to cover all such changes and modifications as fall within the true spirit and scope of our invention.

What we claim as new and desire to secure by Letters Patent of the United States is:

1. Electic bus structure comprising:
   (a) a bus bar,
   (b) a post-type insulator of porcelain supporting said bus bar,
   (c) a coating of insulating material completely covering all external surfaces of said bus bar in the general region of said insulator,
   (d) said post-type insulator having an end surface facing said bus bar and having a cavity in said end surface,
   (e) a U-shaped bracket of insulating material having a bight portion extending across said end surface and a pair of spaced-apart arms at opposite ends of said bight portion extending in a direction away from said insulator,
   (f) a plug on said bight portion extending into said cavity and bonded to said insulator,
   (g) means clamping said bus bar to said bracket in a position between said arms without perforating said insulating coating,
   (h) all of the structure adjacent said bus bar in the region of said insulator and all structure interposed between said insulator and said bus bar, including said bracket, plug and clamping means, being of insulating material.

2. The bus structure of claim 1 in which said bight portion is provided with integrally-formed ribs extending laterally of said bus bar and forming a seat against which said bus bar bears, said ribs projecting from said arms and being integrally joined thereto near said bight portion to increase the stiffness of the arms and resistance to deflection laterally of said bus bar.

3. The bus structure of claim 1 in which said arms are located closely adjacent the lateral edges of said bus bar so as to preclude substantial lateral movement of said bus bar with respect to said bracket and insulator.

References Cited

UNITED STATES PATENTS

| 2,246,904 | 6/1941 | Stockinger | 174—156 X |
| 3,180,922 | 4/1965 | Gallant et al. | 174—171 X |

FOREIGN PATENTS

Ad. 36,980  5/1930  France.

LARAMIE E. ASKIN, Primary Examiner

U.S. Cl. X.R.

174—156